(12) United States Patent
Duboue et al.

(10) Patent No.: US 9,316,333 B2
(45) Date of Patent: Apr. 19, 2016

(54) UNDERWATER CABLE DEPLOYMENT SYSTEM AND METHOD

(71) Applicant: SERCEL, Carquefou (FR)

(72) Inventors: Alexis Duboue, Carquefou (FR); Noel Voisin, Lorient (FR)

(73) Assignee: SERCEL (FR)

( * ) Notice: Subject to any disclaimer, the term of this patent is extended or adjusted under 35 U.S.C. 154(b) by 0 days.

(21) Appl. No.: 14/038,233

(22) Filed: Sep. 26, 2013

(65) Prior Publication Data

US 2014/0086687 A1    Mar. 27, 2014

(30) Foreign Application Priority Data

Sep. 27, 2012 (EP) ................................ 12186213

(51) Int. Cl.
| | | |
|---|---|---|
| H02G 1/10 | (2006.01) | |
| F16L 1/16 | (2006.01) | |
| B63C 11/40 | (2006.01) | |
| B63C 11/42 | (2006.01) | |
| G01V 1/38 | (2006.01) | |

(52) U.S. Cl.
CPC . *F16L 1/16* (2013.01); *B63C 11/40* (2013.01); *B63C 11/42* (2013.01); *G01V 1/3852* (2013.01); *H02G 1/10* (2013.01)

(58) Field of Classification Search
CPC .......... B63C 11/40; B63C 11/42; F16L 1/16; G01V 1/3852; H02G 1/10
USPC ............ 405/154.1, 158, 164, 165, 168.1, 190
See application file for complete search history.

(56) References Cited

U.S. PATENT DOCUMENTS

| | | | | |
|---|---|---|---|---|
| 4,010,619 | A * | 3/1977 | Hightower et al. ........... | 405/191 |
| 5,752,460 | A * | 5/1998 | Buffman et al. .............. | 114/244 |
| 6,223,675 | B1* | 5/2001 | Watt et al. ..................... | 114/312 |
| 6,350,085 | B1* | 2/2002 | Bath et al. .................. | 405/154.1 |
| 6,776,559 | B1* | 8/2004 | Peterson ........................ | 405/158 |
| 6,796,261 | B2* | 9/2004 | Colyer .......................... | 114/258 |
| 8,758,072 | B2* | 6/2014 | Voisin et al. ...................... | 441/1 |
| 2002/0172562 | A1* | 11/2002 | Worman et al. ............... | 405/161 |
| 2003/0218937 | A1* | 11/2003 | Berg et al. ....................... | 367/16 |
| 2005/0276665 | A1 | 12/2005 | Entralgo et al. | |
| 2012/0134752 | A1* | 5/2012 | Eisenhower et al. ......... | 405/166 |

FOREIGN PATENT DOCUMENTS

| | | |
|---|---|---|
| EP | 2474467 A1 | 7/2012 |
| GB | 2470784 A | 12/2010 |
| WO | 0121479 A1 | 3/2001 |

OTHER PUBLICATIONS

European Search Report for corresponding application EP12186213: Report Date Feb. 13, 2013.

* cited by examiner

*Primary Examiner* — Benjamin Fiorello
(74) *Attorney, Agent, or Firm* — Cantor Colburn LLP

(57) ABSTRACT

An underwater cable deployment system for deploying an ocean bottom cable on the seabed including a cage having a lower frame and an upper frame, which lower frame is adapted to receive the ocean bottom cable and the upper frame is connected to an umbilical cable mounted on a vessel, the upper frame being removably attached to the lower frame, guiding and tensioning means for deploying the ocean bottom cable on the seabed, the lower frame further including a recording unit which is connected to the ocean bottom cable and is adapted to record data detected by at least one sensor unit of the ocean bottom cable and an electrical power unit adapted to provide power to the recording unit and to the ocean bottom cable.

15 Claims, 8 Drawing Sheets

UNDERWATER CABLE DEPLOYMENT SYSTEM AND METHOD

TECHNICAL FIELD OF THE INVENTION

The invention relates generally to marine seismic data acquisition and more particularly to an underwater cable deployment system and method.

BACKGROUND ART

Marine seismic data acquisition is generally conducted by a vessel which tows a seismic source, for example an airgun array, that periodically emits acoustic waves into the water in order to penetrate the seabed. Furthermore, ocean bottom cables being deployed on the seabed and comprising sensor units provided with hydrophones, geophones and accelerometers, detect the acoustic waves reflected off boundaries between layers in geologic formations. More particularly, hydrophones detect acoustic pressure variations while geophones and accelerometers detect particle motion caused by the reflected acoustic waves.

Marine seismic data acquisition may be permanent or non permanent.

In the permanent marine seismic data acquisition, the ocean bottom cables are left on the seabed for a long period of time, for example 25 years. During that time, the ocean bottom cables are connected to a recording unit which may be placed on the vessel, on a buoy or on an offshore platform.

In a non-permanent marine seismic data acquisition, the ocean bottom cables are left on the seabed for a limited period of time. The ocean bottom cables are similarly connected to a recording unit which may be placed on the vessel, on a buoy or on an offshore platform.

Different systems and methods exist for the deployment of an ocean bottom cable on the seabed for performing marine seismic data acquisition. These systems may be used for performing permanent and/or non permanent marine seismic data acquisition.

In a well-known system, a plurality of ocean bottom cables are deployed directly from the surface of a vessel to the seabed with the use of a vessel controlled winch or a linear cable engine. In this system, in order to record the data being detected by the sensor units of the ocean bottom cables, the ocean bottom cables have to be connected to a recording unit placed on the vessel during the performance of either a permanent or a non permanent seismic data acquisition. However, in extreme weather conditions (e.g. strong current and waves) an entanglement between the different ocean bottom cables mounted from the surface of the vessel to the seabed may be provoked and thus the cables might be damaged.

In another example of a cable deployment system and method being disclosed in the United States publication US2005/0276665A1, the cable deployment system uses a cage for transferring the ocean bottom cable from a vessel to the seabed. In an embodiment of this system, the cage is composed of an upper frame and a lower frame and is lowered by the vessel to the seabed by means of a vessel controlled winch and an umbilical attached to the cage. The lower frame of the cage is adapted to receive a reel which is rotatably and removably mounted within the same and the upper frame of the cage is adapted to be removably attached to the lower frame. Furthermore, the reel is adapted to receive an unspoolable length of ocean bottom cable. Once the cage is lowered proximally to the seabed, the vessel starts to move and thus the deployment of the ocean bottom cable on the seabed is achieved. Once the ocean bottom cable is deployed and the reel is empty, the cage may be retrieved by the vessel. Then, the upper frame may be disconnected from the lower frame and the empty reel may be recovered from the cage and be replaced by another reel comprising ocean bottom cable.

However, the above mentioned publication does not solve the problem of cable entanglement described above. Particularly, in the cable deployment system of the above mentioned publication, as well as in similar cable deployment systems wherein the ocean bottom cable is not directly connected to a recording unit placed on a vessel, a riser cable has to be used in order to connect the ocean bottom cable and the recording unit placed on the vessel during the performance of either a permanent or a non permanent data acquisition. Specifically, the riser cable is used to transfer the data being detected by the sensor units of the ocean bottom cable to the recording unit placed on the vessel. Accordingly, in the case of using a plurality of riser cables being connected to a plurality of ocean bottom cables, an entanglement between the riser cables may be provoked in extreme weather conditions and thus the riser cables might be damaged.

SUMMARY OF THE INVENTION

The invention provides an underwater cable deployment system which solves the prior art problem of cable entanglement during the performance of a permanent or non permanent marine seismic data acquisition process.

The invention further provides an underwater cable deployment method, using an underwater cable deployment system according to the invention.

More particularly, the invention in one embodiment provides an underwater cable deployment system for deploying an ocean bottom cable on the seabed, which system comprises:

a cage including a lower frame and an upper frame, which lower frame is adapted to receive the ocean bottom cable and the upper frame is connected to an umbilical cable mounted on a vessel and the upper frame is removably attached to the lower frame;

guiding and tensioning means for deploying the ocean bottom cable on the seabed, The lower frame further comprising a recording unit which is connected to the ocean bottom cable and is adapted to record data detected by at least one sensor unit of the ocean bottom cable and an electrical power unit adapted to provide power to the recording unit and to the ocean bottom cable.

The configuration of a lower frame of a cage which is adapted to be detached from an upper frame of the cage and also comprises a recording unit being connected to the ocean bottom cable in order to record data detected by the ocean bottom cable and an electrical power unit adapted to provide power to the recording unit and to the ocean bottom cable, is a distinguishing feature of the invention. Particularly, this configuration allows the recording unit of the lower frame to autonomously record data being detected by the ocean bottom cable by using the power provided by the electrical power unit, whilst the lower frame is positioned on the seabed. Accordingly, since the recording unit is included in the lower frame of the cage, there is no need of using a riser cable for connecting the ocean bottom cable with a recording unit placed on the vessel, as is the case in the prior art, in order to record the detected data. Thus, the problem of entanglement between the riser cables in extreme weather conditions, as mentioned in the background art, is being solved.

In one embodiment of the underwater cable deployment system, the recording unit is removably attached to the lower frame of the cage.

In another embodiment of the underwater cable deployment system, the recording unit is a solid part of the lower frame of the cage.

In another embodiment of the underwater cable deployment system, the electrical power unit is a solid part of the recording unit.

In a further embodiment of the underwater cable deployment system, the recording unit (70) is adapted to be connected to a Remotely Operated Vehicle (ROV).

In another embodiment of the underwater cable deployment system, the lower frame further comprises an acoustic transmission system being connected to the recording unit and to the electrical power unit. The acoustic transmission system is used for performing acoustic transmission between the cage and the vessel.

In another embodiment of the underwater cable deployment system, the ocean bottom cable is spirally coiled within the lower frame of the cage and has one end connected to the recording unit and the other end mounted on the guiding and tensioning means in a position allowing deployment of the ocean bottom cable on the seabed.

In an embodiment, the guiding and tensioning means are included on the upper frame of the cage and are powered by the umbilical cable.

In another embodiment, the guiding and tensioning means include a pair of guiding rollers, a tensioner comprising a pair of wheels and a guiding gutter.

In another embodiment of the underwater cable deployment system, the upper frame is adapted to be removed from the lower frame by a Remotely Operated Vehicle (ROV) or by a remote hydraulic/electrical locking system powered by the umbilical cable.

In another embodiment of the underwater cable deployment system, the upper frame is adapted to be attached to the lower frame of another cage.

In another embodiment of the underwater cable deployment system, the deployment of the ocean bottom cable is configured to be monitored by a Remotely Operated Vehicle (ROV) or by cameras attached to the cage and powered by the umbilical cable.

In another embodiment of the underwater cable deployment system, the umbilical cable is configured to provide clock reference to the recording unit.

The invention also achieves a method for deploying an ocean bottom cable from a vessel to the seabed. The method comprises the steps of:

disposing the ocean bottom cable into a lower frame of a cage, which lower frame includes a recording unit and an electrical power unit and the recording unit is connected to the electrical power unit;

connecting one end of the ocean bottom cable to the recording unit;

removably attaching an upper frame of the cage to the lower frame of the cage, which upper frame includes guiding and tensioning means;

mounting the other end of the ocean bottom cable to the guiding and tensioning means;

attaching to the upper frame an umbilical cable being adapted to drive the cage 10 downwardly towards the seabed by means of a winch 95 located at the deck of the vessel 90;

driving the cage downwardly from the vessel proximally to the seabed;

initiating movement of the vessel in a predetermined direction of deployment of the ocean bottom cable on the seabed. The cage follows the movement of the vessel and the ocean bottom cable is driven by the guiding and tensioning means and is deployed in said predetermined direction of movement of the cage. The movement of the vessel in said predetermined direction and the operation of said guiding and tensioning means are terminated once the ocean bottom cable has been fully deployed on the seabed;

further lowering the cage in order to position it on the seabed;

removing the upper frame from the lower frame;

retrieving the upper frame of the cage by means of the winch, the lower frame staying on the seabed;

In an embodiment, the method further comprises a step of attaching the upper frame of the cage to at least another lower frame for effecting sequential processes of laying ocean bottom cables in predetermined directions onto the seabed;

In another embodiment, the method further comprises a step of providing clock reference to the recording unit by means of the umbilical cable, once the cage is positioned on the seabed;

BRIEF DESCRIPTION OF THE DRAWINGS

The above characteristics of the present invention will be more apparent by describing an/several embodiments of the present invention in detail with reference to the accompanying drawings, in which.

DESCRIPTION OF THE PREFERRED EMBODIMENTS

Figure 1:
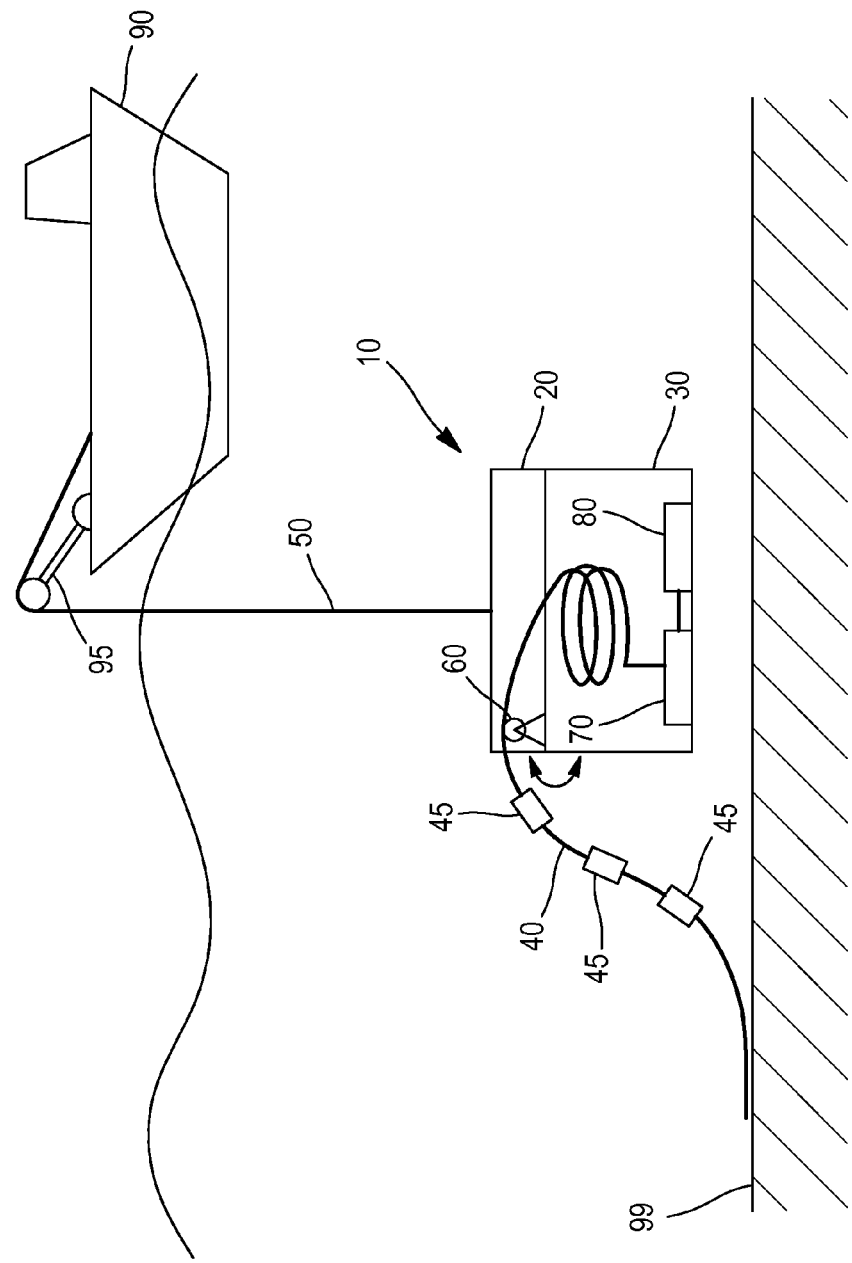
FIG. 1 schematically illustrates an underwater cable deployment system according to an embodiment of the invention.

FIG. 1 illustrates an embodiment of a cable deployment system for deploying an ocean bottom cable 40 downwardly from a vessel with a scope of laying it in a predetermined direction onto the seabed 99. This system may be used for the performance of permanent and/or non permanent marine seismic data acquisition.

Particularly, the cable deployment system shown in FIG. 1 comprises a cage 10 that includes a lower frame 30 and an upper frame 20. The lower frame 30 is adapted to receive the ocean bottom cable 40 and the upper frame 20 is connected to an umbilical cable 50 which is mounted on a vessel 90. The umbilical cable 50 is used to drive the cage 10 to the seabed when the vessel moves in a predetermined direction and further to provide power for the cable deployment process, as will be explained hereinafter. In an embodiment, as illustrated in FIG. 1, the umbilical cable 50 may be mounted on the vessel 90 by means of a winch 95 controlled by a guidance system (not shown in the Figures).

Furthermore, in the embodiment illustrated in FIG. 1, the upper frame 20 is removably attached to the lower frame 30. In an embodiment, the upper frame 20 may be removed from the lower frame 30 by a Remotely Operated Vehicle (ROV) being controlled by the vessel or by a remote hydraulic/electrical locking system powered by the umbilical 50 and being included in the upper frame 20, by means known to the person skilled in the art. In another embodiment, the upper frame 20 may, after having been removed from a lower frame 30 as will be explained hereinafter, be adapted to be attached on another lower frame and being driven downwardly from the vessel 90 to the seabed 99 by means of the umbilical cable 50.

Figure 2:
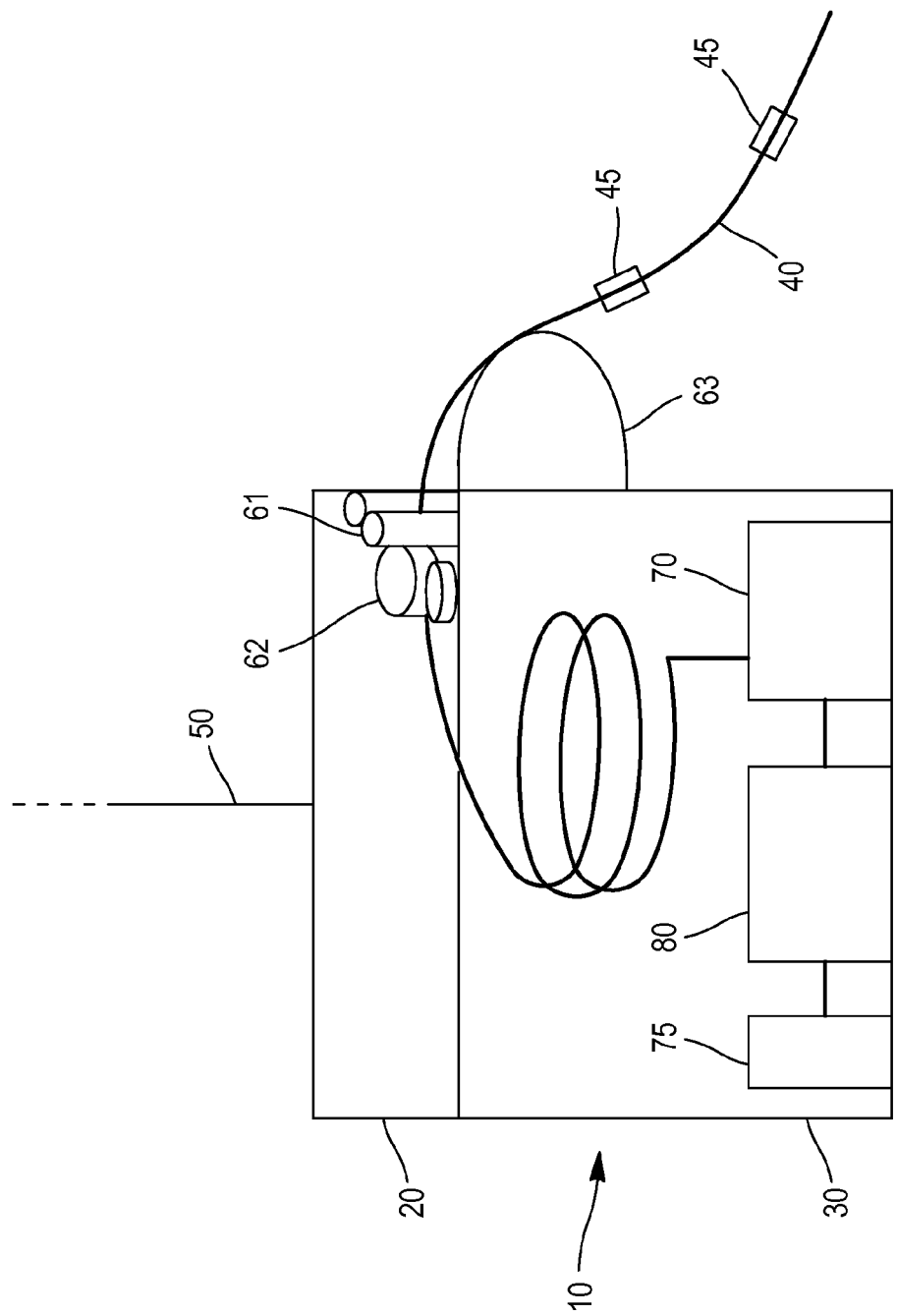
FIG. 2 schematically illustrates a cage employed in the underwater deployment system according to an embodiment of the invention.

The cable deployment system shown in the embodiment of FIG. 1 further comprises guiding and tensioning means 60 for deploying the ocean bottom cable 40 on the seabed 99. In an embodiment, as illustrated in FIG. 2, the guiding and tensioning means may include a pair of guiding rollers 61, a tensioner comprising a pair of wheels 62 and a guiding gutter 63. In another embodiment, as illustrated in FIG. 2, the guiding and tensioning means may be included on the upper frame 20 of the cage 10 and may be powered by the umbilical cable 50. Also, in an embodiment, as illustrated in FIG. 2, the guiding gutter 63 may be part of the lower frame 30. The deployment of an ocean bottom cable by using the above mentioned guiding and tensioning means is known to the person skilled in the art.

Additionally, the lower frame 30 illustrated in the embodiment of FIG. 1 comprises a recording unit 70 being connected to the ocean bottom cable 40 and being adapted to record seismic data detected by at least one sensor unit 45 of the ocean bottom cable 40, when the lower frame 30 is positioned on the seabed 99 and the ocean bottom cable 40 is fully deployed. Typically, the ocean bottom cable 40 includes a plurality of sensor units 45 being sequentially disposed at a predetermined spacing all along the length of the same. Each sensor unit 45 includes at least one seismic sensor allowing to detect particle motion waves (geophones) and/or pressure waves (hydrophones) and/or accelerometers in order to perform seismic data acquisition. The recording unit 70, as will be explained hereinafter, is powered by an electrical power unit 80. Also, it includes electronics for controlling and retrieving data from the ocean bottom cable 40 as well as a data storage for storing the data being detected by the ocean bottom cable 40 during the period of a permanent or non permanent seismic data acquisition. Furthermore, the recording unit 70 includes a stable clock (not shown in the Figures) being used for the performance of clock synchronization by means of the umbilical cable 50, as will be explained below.

In an embodiment, the recording unit 70 may be removably attached to the lower frame 30 of the cage 10. The recording unit 70 may be adapted to be connected to a Remotely Operated Vehicle (ROV) in order to be transferred to the vessel 99, where the seismic data can be transferred and stored by any means in a memory device of a central processing unit (CPU) located on the vessel (not shown in the Figures).

This configuration with the removable recording unit 70, particularly allows avoiding to retrieve the whole cage 10 on the vessel in order to transfer the recorded data from the data storage of the removable recording unit 70 to the central processing unit (CPU) of the vessel. This configuration can be used during a permanent or a non-permanent seismic data acquisition.

In another embodiment, the recording unit 70 may be a solid part of the lower frame 30 of the cage 10. In that case, a Remotely Operated Vehicle (ROV) having a memory unit may be connected to the recording unit 70, for example by means of a USB connector or any kind of electrical or optical connector, radio frequency or laser contactless communication, in order to store the data being recorded and then transfer it to the central processing unit (CPU) disposed on the vessel. Alternatively, the lower frame 30 of the cage 10 including the recording unit 70 may be retrieved on the vessel by means of the umbilical cable, notably in the case of a non-permanent seismic data acquisition. Thus, the recorded data may be transferred directly from the data storage of the recording unit 70 to a central processing unit (CPU) disposed on the vessel without the need of a Remotely Operated Vehicle (ROV) for storing and transferring the recorded data to the CPU.

In the case of a permanent data acquisition, an ROV is always necessary for performing data transfer on the CPU disposed on the vessel, either directly from the data storage of the removable recording unit 70 being transferred on the vessel by the ROV or directly from the memory unit of the ROV.

In the case of a non-permanent data acquisition, the data are transferred on the CPU disposed on the vessel directly from the data storage of the removable recording unit 70 transferred on the vessel by the ROV, or from the memory unit of the ROV, or from the data storage of the removable recording unit 70 of the complete cage 10 retrieved on the vessel.

The lower frame 30 of the embodiment illustrated in FIG. 1, also comprises an electrical power unit 80 (e.g. one or more electrochemical cells) adapted to provide power to both the recording unit 70 and to the ocean bottom cable 40. The connection between the recording unit 70 and the electrical power unit 80 may be made by electrical conductors.

It is important to note that having a cage 10 being adapted to be lowered to the seabed 99 and including on its lower frame 30 a recording unit 70 and an electrical power unit 80, wherein such lower frame may be detached from the upper frame 20 and stay on the seabed 99, is advantageous. This is because the data detected by at least one sensor unit 45 may be recorded directly to the recording unit 70 included in the lower frame 30, whilst the latter is positioned on the seabed 99. As a result, there is no need of using a riser cable for connecting the ocean bottom cable with a recording unit placed on the vessel in order to record the detected data, as is the case in the prior art cable deployment systems. Thus, the problem of entanglement between the riser cables in extreme weather conditions, as mentioned in the background art, is being solved.

In an embodiment, as illustrated in FIG. 2, an acoustic transmission system 75 may be connected to the recording unit 70 and to the electrical power unit 80 and it may be used for performing acoustic transmission between the cage 10 and the vessel 90 during the seismic data acquisition by means of an acoustic transponder. This allows the performance of a quality control (QC) of the operation of the recording unit 70 by the vessel 90, in order to check that the recording unit 70 is fully functional. Also, the power status (on/off) of the recording unit 70 may be controlled from the vessel 90.

In another embodiment, the umbilical cable 50 may be adapted to provide power to the guiding and tensioning means and particularly to the tensioner comprising a pair of wheels 62. In that embodiment, the umbilical cable may be connected to the guiding and tensioning means by electrical conductors. The umbilical cable 50 may be used to provide power to the guiding and tensioning means till the ocean bottom cable 40 is fully deployed on the seabed 99.

In another embodiment, the umbilical cable 50 may provide stable clock reference (by using a GPS for example) to the recording unit 70 by means known to the person skilled in the art. This may be performed once the cage 10 is positioned to the seabed 99 and the ocean bottom cable is fully deployed (FIG. 5), or at any time clock synchronization may be necessary, for example at the beginning or at the end of the seismic data acquisition. Also, the umbilical cable 50 may be used for the performance of Quality Control (QC) in order to check that the recording unit 70 is fully functional before the disconnection of the upper frame 20 from the lower frame 30.

Furthermore, in another embodiment, the umbilical cable 50 may be used to charge the electrical power unit 80. In that embodiment, when the cage 10 lies on the seabed for a long period for performing either a permanent or a non-permanent seismic data acquisition, the umbilical cable 50 may be connected to the electrical power unit 80 by means of electrical conductors in order to charge the latter. However, normally, the charging of the electrochemical cells of the electrical power unit 80 is performed whilst the lower frame 30 of the cage 10 is on the vessel 90.

In another embodiment of the invention, the power unit is a solid part of the recording unit 70. This embodiment is particularly well adapted if the recording unit 70 is removably attached to the lower frame. Indeed, the power unit 80 can be charged onboard the vessel and thus the data of the data storage of the removable recording unit 70 can be transferred to the CPU.

In another embodiment, as shown in FIG. 2, the ocean bottom cable 40 may be spirally coiled within the lower frame 30 of the cage 10, having one end connected to the recording unit 70 and the other end mounted on the guiding and tensioning means in a position allowing deployment of the ocean bottom cable 40 on the seabed 99. The connection of the one end of the ocean bottom cable 40 to the recording unit 70 and the mounting of the other end on the guiding and tensioning means is being performed before driving the cage 10 to the seabed 99. Since the ocean bottom cable 40 is being driven to the seabed 99 by means of the cage 10 and it is not directly deployed from the vessel as is the case in many known cable deployment systems, it may have a low weight and a low bending stiffness. Using an ocean bottom cable of low weight and low bending stiffness allows to deploy the same from the lower frame 30, without the need of a drum or a reel disposed on the lower frame 30. Thus, the weight of the cage 10 to be driven from the vessel 90 to the seabed 99 may be significantly reduced. Another advantage of using an ocean bottom cable with a low weight and a low bending stiffness is that the deployment of the latter in case of a seabed with multiple subsea obstacles (e.g. rocks) is smooth and thus the risk of damages on the ocean bottom cable is low. Also, the fact that the ocean bottom cable 40 is being driven to the seabed 99 by means of the cage 10 allows to deploy the ocean bottom cable in very deep water without the need to increase its weight and bending stiffness.

In another embodiment, the deployment of the ocean bottom cable 40 may be configured to be monitored by a Remotely Operated Vehicle (ROV) or by cameras 64 being attached to the upper frame 20 of the cage 10 and being powered by the umbilical cable 50.

In an embodiment, the lower frame 30 of the cage 10 may comprise a first and a second compartment. The first compartment may be adapted to receive the ocean bottom cable 40 whilst the second compartment may include the recording unit 70 and the electrical power unit 80, wherein both the recording unit 70 and the electrical power unit 80 being fixedly disposed at the bottom of the lower frame 30. In this way, the electronics comprised in the recording unit 70 and the electrical power unit 80 are waterproof shielded. However, in another embodiment which may be particularly applied in the case of a non permanent seismic data acquisition, each of the recording unit 70 and the electrical power unit 80 may be waterproof shielded and being fixedly disposed at the bottom of the lower frame 30 without the need of separating the lower frame 30 in two compartments Another advantage of the present invention is well appreciated in case of multiple subsea objects crossing (pipeline, etc. . . . ) when cables are deployed. In this situation, the present invention allows some pieces of seismic cable to be deployed between the objects to cross, with a dedicated recording unit and basket. Thus, there is no need to manage objects crossing protection.

Figure 3:
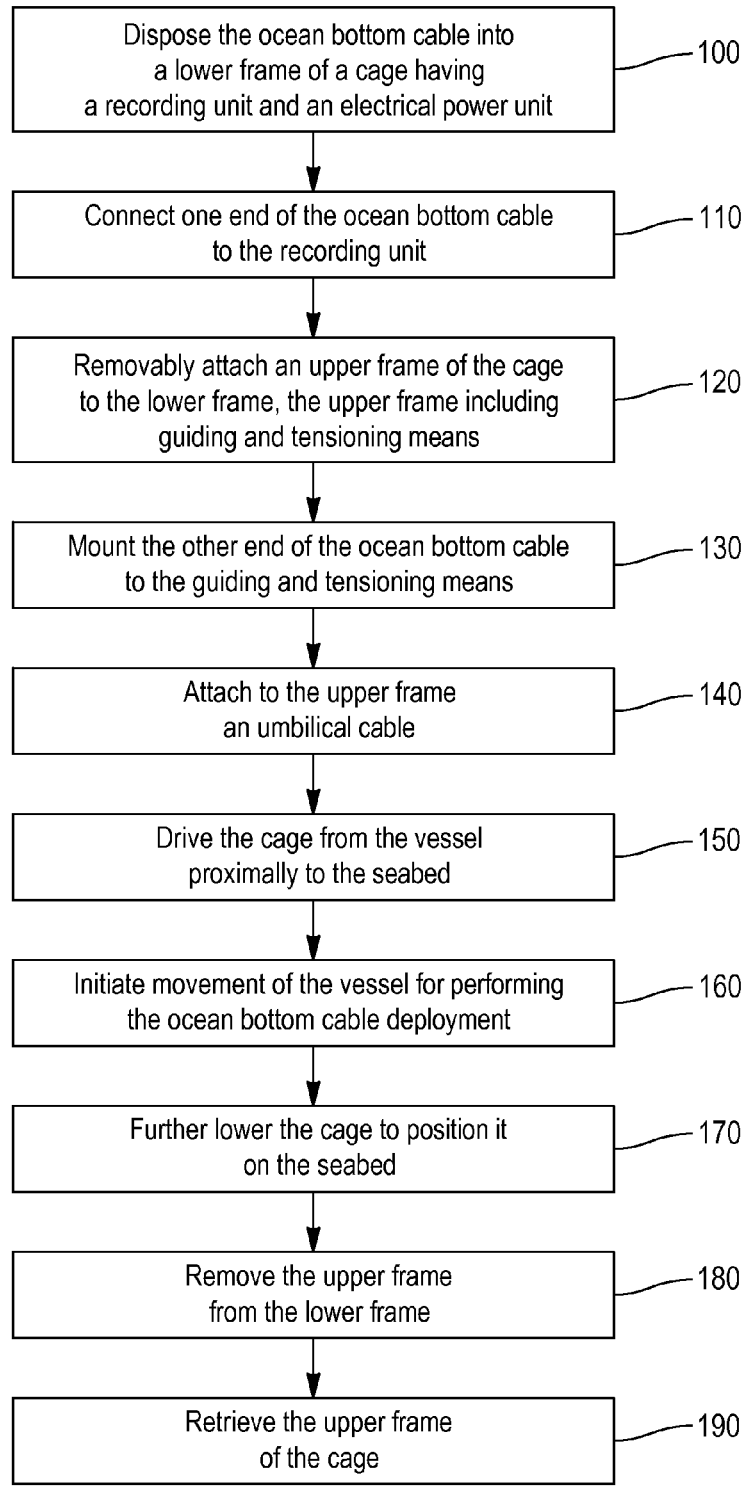
FIG. 3 illustrates a flowchart of a method for deploying a cable according to an embodiment of the invention.

Referring now to FIG. 3, an embodiment of a method for deploying an ocean bottom cable 40 from a vessel 90 to the seabed 99 will be described. It is important to note that this method may be applied for performing either permanent or non permanent marine seismic data acquisition.

In a step 100, the ocean bottom cable 40 is disposed into a lower frame 30 of a cage 10. The ocean bottom cable 40 may be disposed into the lower frame 30 by means of a winch being located on the vessel 90 or by means of a linear cable engine. Since, as mentioned above, the ocean bottom cable construction may be very light, manual handling may also be used for disposing the ocean bottom cable into the lower frame. The lower frame 30 includes a recording unit 70 and an electrical power unit 80, being connected to each other, for example, by means of electrical conductors. The recording unit 70 and the electrical power unit 80 may be disposed at the bottom of the lower frame 30.

In a step 110, one end of the ocean bottom cable 40 is connected with the recording unit 70. As described hereinabove, the ocean bottom cable 40 includes at least one sensor unit 45 for detecting seismic data when the ocean bottom cable 40 is laid on the seabed 99. The connection between the ocean bottom cable 40 and the recording unit 70 allows to record and store the above mentioned seismic data on the recording unit 70.

In a step 120, an upper frame 20 of the cage 10 is removably attached to the lower frame 30 of the cage 10, the upper frame 20 including guiding and tensioning means 60 being described hereinabove. This attachment may be implemented by attaching means including a hydraulic/electrical locking system adapted to be remotely operated by the vessel 90 through the umbilical cable 50, as it is known to the person skilled in the art.

In a step 130, the other end of the ocean bottom cable 40 is mounted to the guiding and tensioning means 60. In the embodiment wherein the guiding and tensioning means include a pair of guiding rollers 61, a tensioner comprising a pair of wheels 62 and a guiding gutter 63, the other end of the ocean bottom cable 40 is mounted on the pair of wheels 62 and on the pair of guiding rollers 61.

In a step 140, an umbilical cable 50 being adapted to drive the cage 10 downwardly towards the seabed 99 by means of a winch 95 located at the vessel 90, is attached to the upper frame 20. The attachment is being made by means known to the person skilled in the art.

In a step 150, the cage 10 is being driven from the vessel 90 proximally to the seabed 99 by means of the winch 95.

Figure 4:
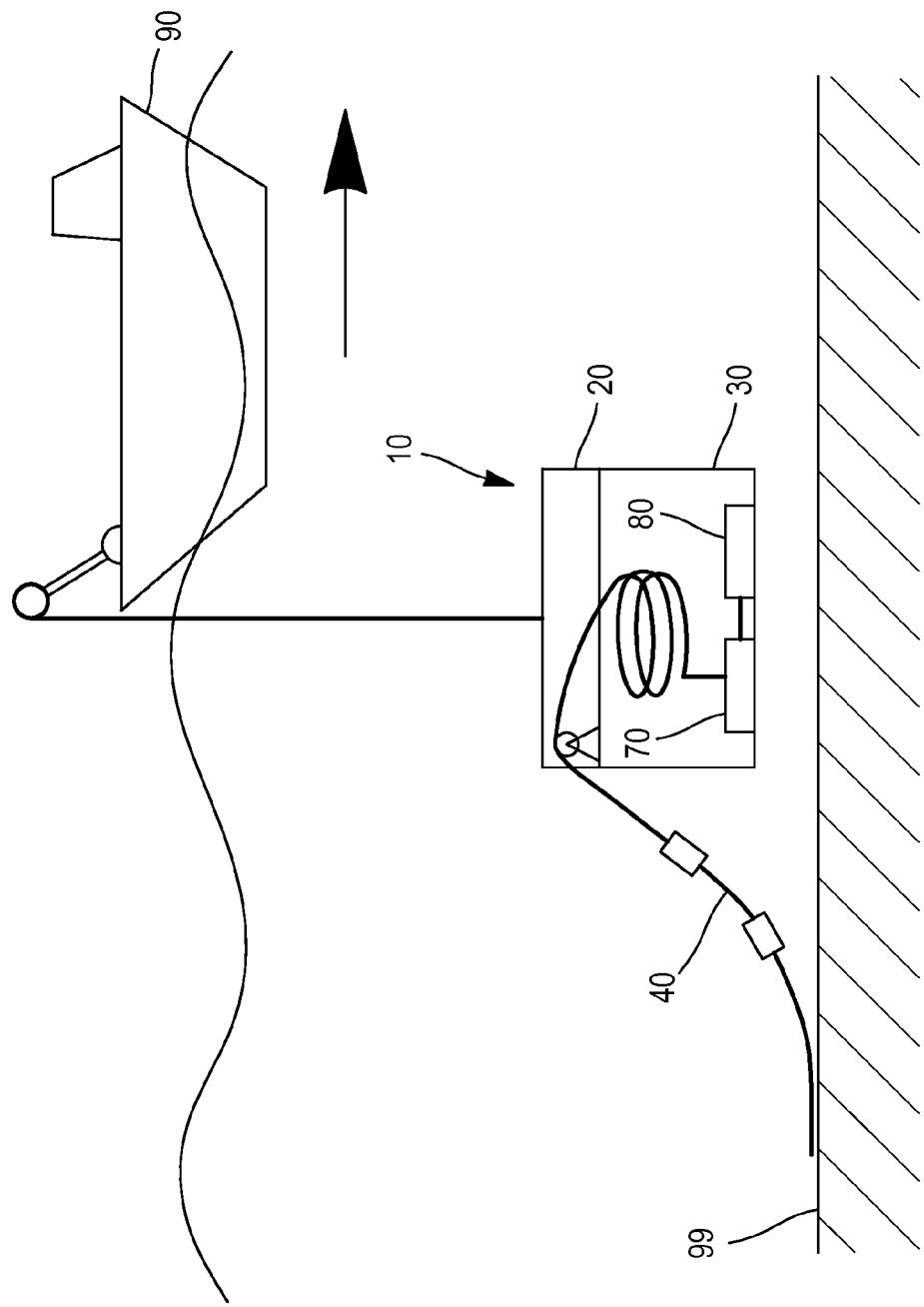
FIG. 4 schematically illustrates an ocean bottom cable deployment being achieved by the movement of a vessel according to an embodiment of the invention.

In a step 160, as illustrated in FIG. 4, the movement of the vessel 90 is initiated in a predetermined direction of deployment of the ocean bottom cable 40 on the seabed 99. During the movement of the vessel 90 in the above mentioned predetermined direction, the cage 10 follows the movement of the vessel and at the same time the ocean bottom cable 40 is being driven by the guiding and tensioning means 60 and is accordingly being deployed in said predetermined direction. The guiding and tensioning means 60 may be powered by the umbilical cable 50. The movement of the vessel 90 and the operation of the guiding and tensioning means 60 is being terminated once the ocean bottom cable 40 has been fully deployed on the seabed 99. It is important to note that during the performance of step 160, the cage 10 is not positioned on the seabed 99 but it is being moved proximally to the seabed 99.

In a step 170, the cage 10 is further lowered by means of the winch 95 in order to be positioned on the seabed 99.

Figure 5:
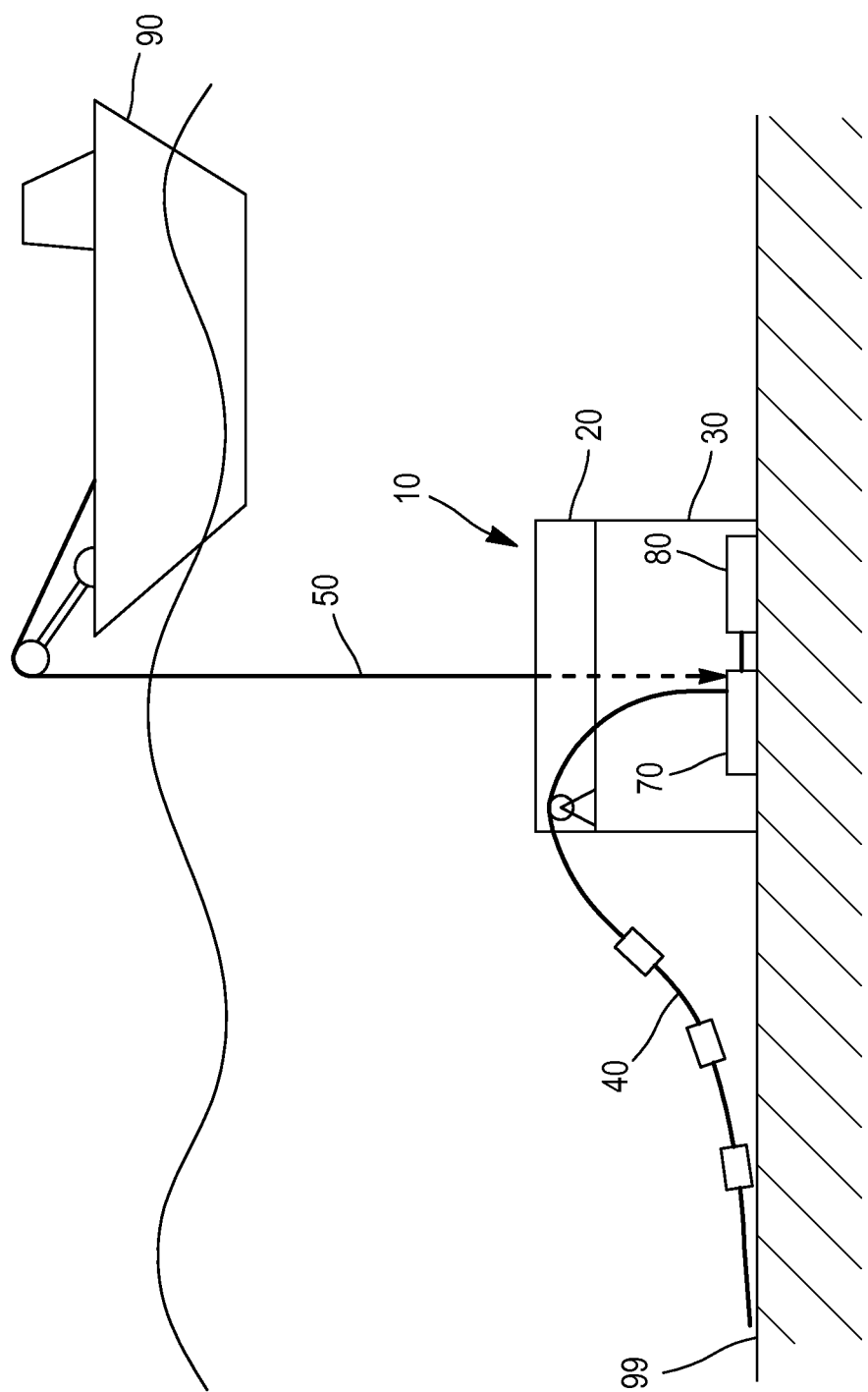
FIG. 5 schematically illustrates a clock synchronization that is being performed by the umbilical cable when the cage is laid on the seabed and the ocean bottom cable has been fully deployed according to an embodiment of the invention.

In an embodiment of the method, as illustrated in FIG. 5, once the cage 10 is lowered to be positioned on the seabed 99 and the ocean bottom cable is fully deployed, the umbilical cable 50 may provide clock reference (GPS for example) to the recording unit 70, by means known to the person skilled in the art.

In a step 180, the upper frame 20 is removed from the lower frame 30 Such removal may be performed by a Remotely Operated Vehicle (ROV) or by a remote hydraulic/electrical locking system powered by the umbilical 50 known to the person skilled in the art.

Figure 6:
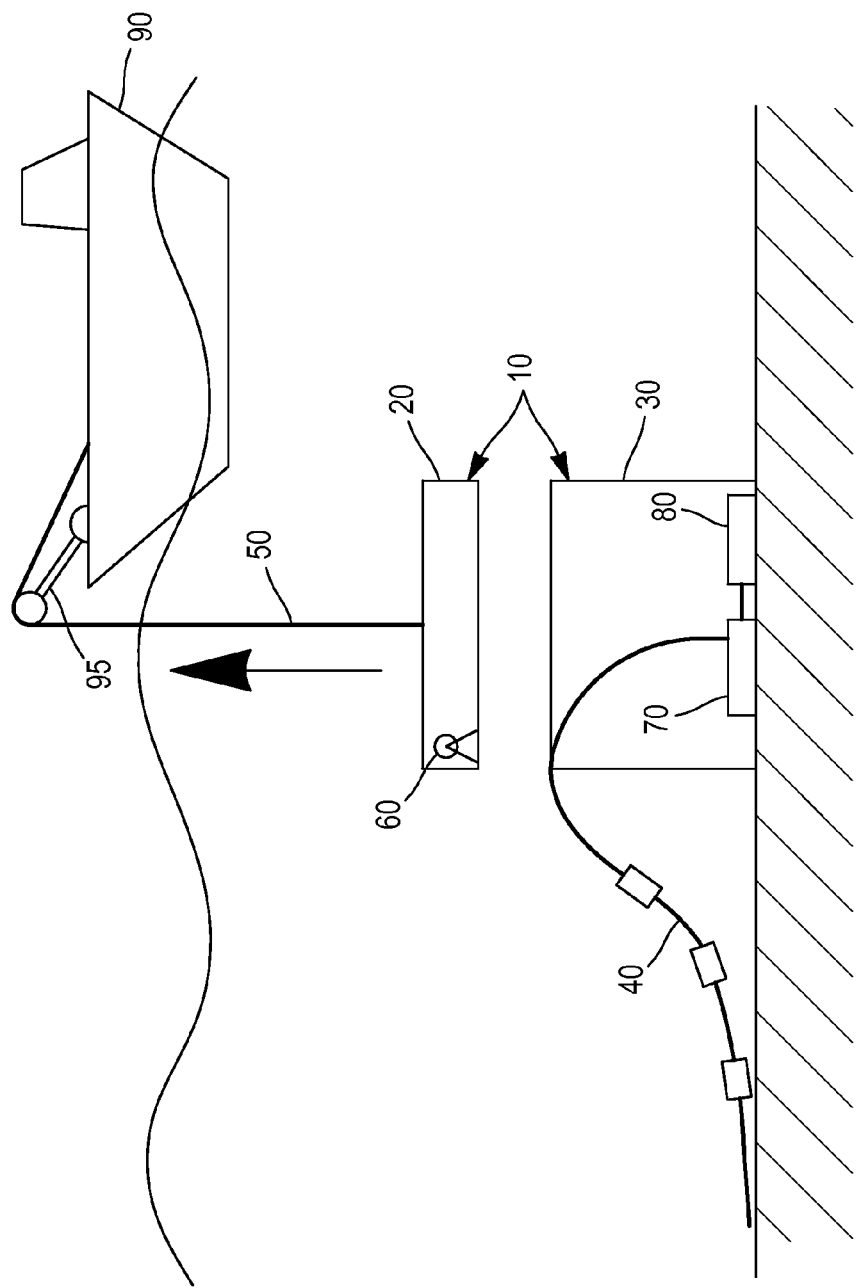
FIG. 6 schematically illustrates the upper frame of the cage being removed from the lower frame of the cage according to an embodiment of the invention.

In a step 190, as illustrated in FIG. 6, the upper frame 20 of the cage 10 is retrieved by the vessel 90 by means of the umbilical cable 50 being mounted on the winch 95.

It is important to note that after the retrieval of the upper frame 20, the lower frame 30 including the recording unit 70 and the electrical power unit 80 stays on the seabed 99 in order to record the data being detected by the sensor units 45 of the ocean bottom cable 40 being connected to the recording unit 70 during the seismic data acquisition. As mentioned above, this is advantageous since there is no need of using a riser cable for connecting the ocean bottom cable with a recording unit placed on the vessel in order to record the detected data, as is the case in the prior art cable deployment systems. Thus, the problem of entanglement between the riser cables in extreme weather conditions, as mentioned in the background art, is being solved.

In the case that the recording unit 70 is removably attached to the lower frame 30, a Remotely Operated Vehicle (ROV) may be used to retrieve the recording unit 70. Then the seismic data having been recorded in the recording unit 70 may be processed by a central processing unit (CPU) located at the vessel 90. Alternatively, in case that the recording unit 70 is a solid part of the lower frame 30, a Remotely Operated Vehicle (ROV) having a memory unit may be connected to the recording unit 70, for example by means of a USB connector, in order to store the data being recorded and then transfer it to the central processing unit of the vessel 90.

Figure 7:
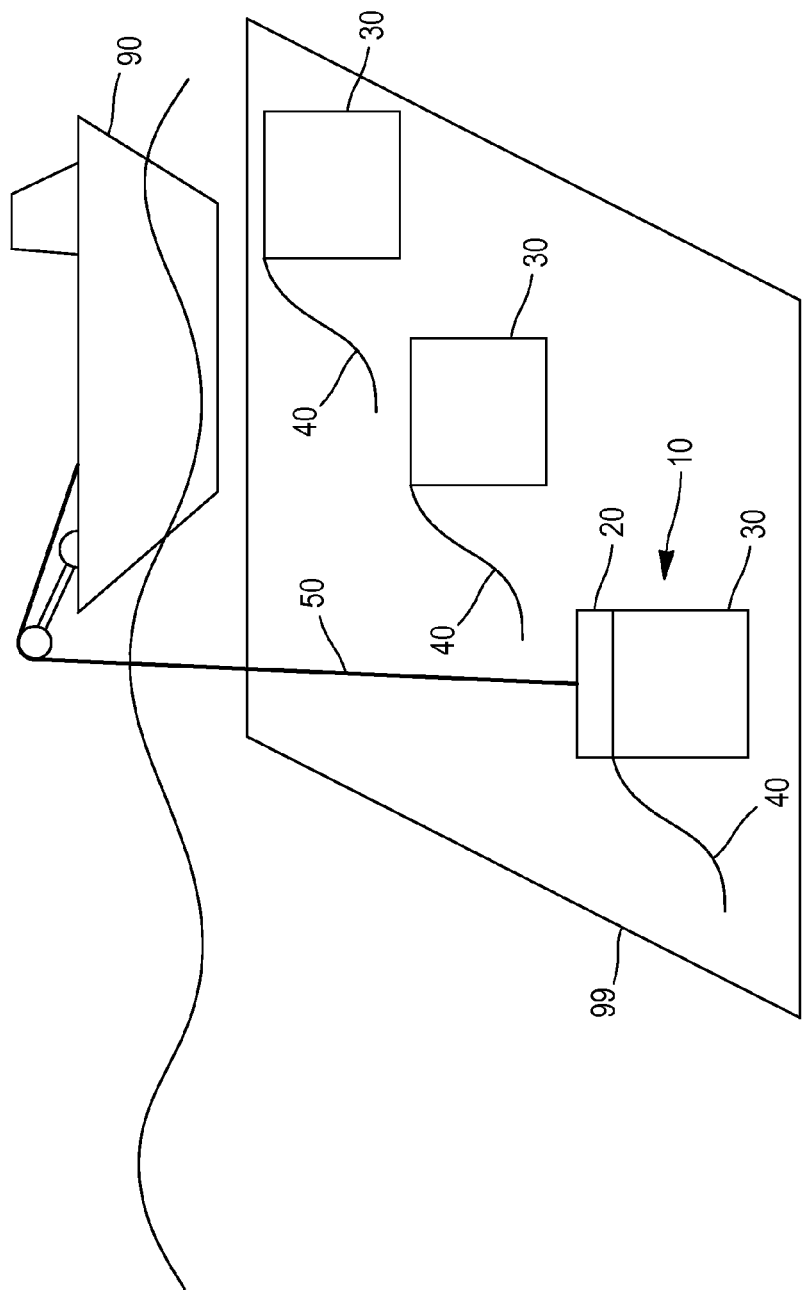
FIG. 7 schematically illustrates a sequential deployment of a plurality of ocean bottom cables according to an embodiment of the invention.

In an embodiment of the method, the upper frame 20 may, after being removed from the lower frame 30, be attached to at least another lower frame 30 including a recording unit 70 and drive it to the seabed thereby being adapted to perform sequential processes of laying a plurality of ocean bottom cables 40 in predetermined directions onto the seabed 99. In an embodiment, as shown in FIG. 7, a plurality of lower frames are being driven from the vessel 90 to the seabed by means of a single umbilical cable 50 and a plurality of ocean bottom cables is thereby being laid on the seabed. This is advantageous since it reduces the manufacturing cost of the cages and also reduces the weight to be carried by the vessel.

Figure 8:
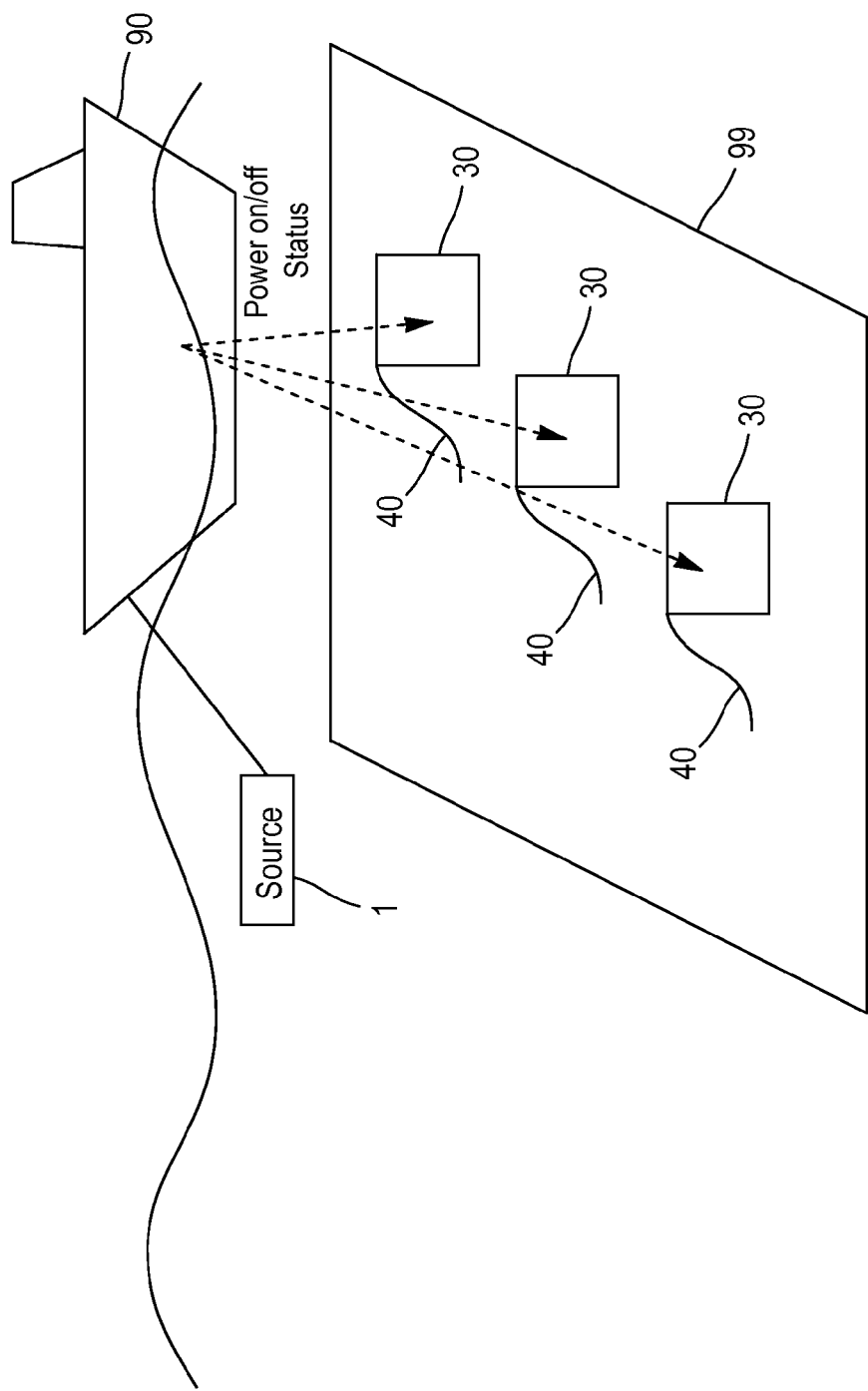
FIG. 8 schematically illustrates the performance of seismic data acquisition after the plurality of ocean bottom cables have been laid onto the seabed.

In another embodiment of the method, as illustrated in FIG. 8, the seismic data acquisition may be performed when a plurality of ocean bottom cables are laid on the seabed. A seismic source 1, for example an airgun array, periodically emits acoustic waves into the water in order to penetrate the seabed. As shown in FIG. 8, the power on/off status of the recording units located at each one of the lower frames 30 is controlled by the vessel 90 by means of an acoustic transmission system 75 being connected to the recording unit 70 and to the electrical power unit 80 and performs acoustic transmission between the lower frames and the vessel 90.

The invention claimed is:

1. An underwater cable deployment system for deploying an ocean bottom cable on the seabed, comprising:
   a cage including a lower frame and an upper frame, said lower frame being adapted to receive the ocean bottom cable and said upper frame being connected to an umbilical cable mounted on a vessel, said upper frame being removably attached to the lower frame;
   guiding and tensioning means for deploying the ocean bottom cable on the seabed,
   said lower frame further comprising a recording unit being connected to the ocean bottom cable and being adapted to record data detected by at least one sensor unit of the ocean bottom cable and an electrical power unit adapted to provide power to the recording unit and to the ocean bottom cable,
   wherein the ocean bottom cable is spirally coiled within the lower frame of the cage, having one end connected to the recording unit and the other end mounted on the guiding and tensioning means in a position allowing deployment of the ocean bottom cable on the seabed.

2. The underwater cable deployment system of claim 1, wherein the recording unit is removably attached to the lower frame of the cage.

3. The underwater cable deployment system of claim 1, wherein the recording unit is a solid part of the lower frame of the cage.

4. The underwater cable deployment system according to claim 1, wherein the electrical power unit is a solid part of the recording unit.

5. The underwater cable deployment system according to claim 1, wherein the recording unit is adapted to be connected to a Remotely Operated Vehicle.

6. The underwater cable deployment system according to claim 1, wherein the lower frame further comprises an acoustic transmission system being connected to the recording unit and to the electrical power unit for performing acoustic transmission between the cage and the vessel.

7. The underwater cable deployment system according to claim 1, wherein the guiding and tensioning means are included on the upper frame of the cage and are powered by the umbilical cable.

8. The underwater cable deployment system according to claim 7, wherein the guiding and tensioning means include a pair of guiding rollers, a tensioner comprising a pair of wheels and a guiding gutter.

9. The underwater cable deployment system according to claim 1, wherein the upper frame is adapted to be removed from the lower frame by a Remotely Operated Vehicle or by a remote hydraulic/electrical locking system powered by the umbilical cable.

10. The underwater cable deployment system according to claim 9, wherein the upper frame is adapted to be attached to the lower frame of another cage.

11. The underwater cable deployment system according to claim 1, wherein the deployment of the ocean bottom cable is configured to be monitored by a Remotely Operated Vehicle or by cameras attached to the cage and powered by the umbilical cable.

12. The underwater cable deployment system according to claim 1, wherein the umbilical cable is configured to provide clock reference to the recording unit.

13. A method for deploying an ocean bottom cable from a vessel to the seabed, comprising the steps of:
- disposing the ocean bottom cable into a lower frame of a cage, said lower frame including a recording unit and an electrical power unit, said recording unit being connected to the electrical power unit;
- connecting one end of the ocean bottom cable to the recording unit;
- removably attaching an upper frame of the cage to the lower frame of the cage, said upper frame including guiding and tensioning means;
- mounting the other end of the ocean bottom cable to the guiding and tensioning means;
- attaching to the upper frame an umbilical cable being adapted to drive the cage downwardly towards the seabed by means of a winch located at the deck of the vessel;
- driving the cage downwardly from the vessel proximally to the seabed;
- initiating movement of the vessel in a predetermined direction of deployment of the ocean bottom cable on the seabed, said cage following the movement of the vessel and said ocean bottom cable being driven by the guiding and tensioning means and being deployed in said predetermined direction of movement of the cage, wherein movement of the vessel in said predetermined direction and operation of said guiding and tensioning means are terminated once said ocean bottom cable has been fully deployed on the seabed;
- further lowering the cage to position it on the seabed;
- removing the upper frame from the lower frame;
- retrieving the upper frame of the cage by means of the winch, said lower frame staying on the seabed.

14. The method of claim 13, further comprising attaching said upper frame of the cage to at least another lower frame for effecting sequential processes of laying ocean bottom cables in predetermined directions onto the seabed.

15. The method of claim 13, further comprising providing clock reference to the recording unit by means of the umbilical cable, once the cage is positioned on the seabed.

* * * * *